Dec. 14, 1926.  
E. M. JONES ET AL  
1,610,288  
RECOVERY OF OXIDES OF NITROGEN  
Filed August 1, 1924
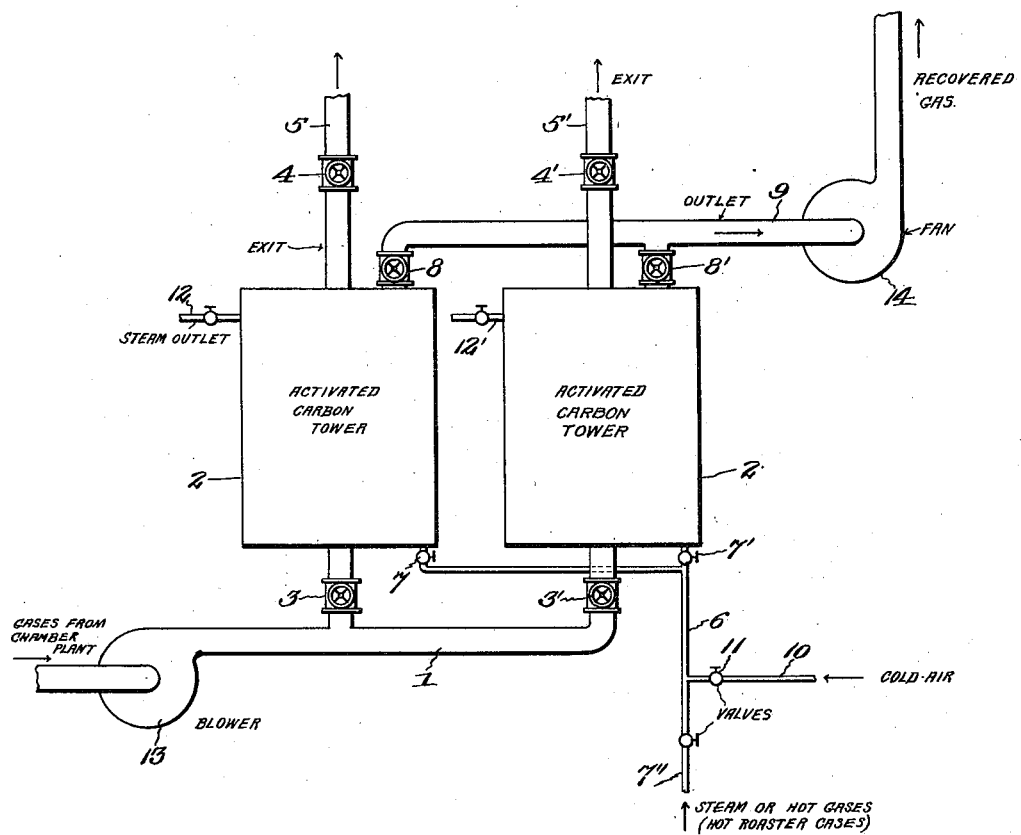

Patented Dec. 14, 1926.

1,610,288

UNITED STATES PATENT OFFICE.

EDWARD M. JONES AND GEORGE E. BEAVERS, OF COPPERHILL, TENNESSEE; ANDREW M. FAIRLIE, OF ATLANTA, GEORGIA; AND JOHN N. HOUSER, OF KNOXVILLE, TENNESSEE, ASSIGNORS TO TENNESSEE COPPER & CHEMICAL CORPORATION, OF NEW YORK, N. Y., A CORPORATION OF NEW YORK.

RECOVERY OF OXIDES OF NITROGEN.

Application filed August 1, 1924. Serial No. 729,547.

This invention relates to the recovery of an oxide, or oxides, of nitrogen, from gas mixtures containing such oxides notably from the exit gases of the manufacture of sulphuric acid, and to the expulsion of adsorbed oxides from the adsorbing medium whereby such adsorbing medium becomes suitable for further adsorption purposes.

The invention is based upon the discovery that certain carbonaceous substances, when suitably treated to render them "active" or "activated" adsorb oxides of nitrogen and sulfur dioxide, under some conditions separately and under other conditions together, from a gas mixture allowed to come into direct contact with such activated carbonaceous material, and, at ordinary temperatures, retain such adsorbed oxides for an indefinite period. This affords a means of separating such oxides from gases which are not adsorbed by activated carbon.

The object of the invention is to afford a means, more efficient and more economical than any hitherto known, of separating oxides of nitrogen and sulfur dioxide, or the said oxides of nitrogen, from gaseous mixtures containing the same; of liberating the adsorbed oxides from the adsorbing medium, thus rendering the adsorbed gases available for practical use; and of renewing the activity of the adsorbing material.

The invention is applicable to the treatment of nitrous or sulfurous gases in gas mixtures incident to chemical processes, such as the manufacture of sulfuric acid, the manufacture of nitric acid, the oxidation of ammonia, the production of synthetic oxides of nitrogen, the "fixation" of atmospheric nitrogen, the nitration of organic substances and the like.

In the manufacture of sulphuric acid by a nitration process, the invention may be used (a) for the recovery of oxides of nitrogen and residual sulphur dioxide, which ordinarily escape recovery in the Gay-Lussac towers and are therefore lost into the atmosphere; or (b) as a substitute for the Gay-Lussac tower, effecting the recovery of oxides of nitrogen and of residual sulphur dioxide. These results can be effected in a more efficient and more economical manner than Gay-Lussac towers have ever done.

This invention is not limited in its application to the particular chemical processes mentioned above, but is applicable to the separation of oxides of nitrogen (and sulphur dioxide also if desired) from gas mixtures in any chemical process producing gas mixtures containing these oxides.

Activated carbon, as referred to in this specification, comprises the charcoal, or solid carbonaceous residues, derived from hard carbonaceous substances, such as the shells of certain nuts, the kernels, seeds or pits of certain fruits, or other hard woody materials, suitably treated to render the same a powerful adsorbent for certain gases, as well as the less active forms of carbon derived from wood, coke, or other common carboniferous materials, suitably treated to yield adsorptive properties for certain gases. The invention is not limited to the use of any particular type of active carbon, or to carbon from any particular source, but comprises the use, for the purposes herein specified, of carbon of any type or from any source, treated to produce the power of adsorbing within its structure or on its surfaces, oxides of nitrogen with or without sulphur dioxide.

One form of apparatus suitable for the practical application of this invention is shown in diagrammatic vertical elevation, on the annexed drawing, which shows two receptacles or towers for containing activated carbon. 1 is the inlet pipe conveying the gas mixture from the source to the carbon-containing towers 2—2'. This inlet pipe is provided with branches having valves or dampers 3—3', for the purpose of admitting the gas mixture to the two towers alternately. 4—4' are valves or dampers in the exit flues 5—5', the latter also being adapted to be used alternately. 6 is a pipe, equipped with the valves 7—7', for the introduction of steam or hot gases (say hot air) from pipe 7" for the purpose of expelling from the carbon the oxides previously adsorbed therein. These expelled oxides escape alternately through the valves or dampers 8—8' to the pipe 9, which conducts the expelled gases to the place where they are to be put to commercial use. After the adsorbed gases have been driven out of the carbon, to a sufficient extent, by the steam, or hot gases, the pipe 6 can be used for the admission of cold air, or other non-adsorbable gas or gas mixture, into the carbon tower, for the purpose of cooling the carbon and driving out moisture or residual gases, thus rendering the carbon useful for further adsorptive purposes. This cold air can be introduced through valve 11 attached to pipe 10. If steam be used for expelling the adsorbed oxides, it should preferably not come into direct contact with the carbon inside the towers. Therefore the towers in such case are equipped internally with suitable separate conduits for the steam, which is discharged through separate outlets 12—12'. If hot gases or hot air be used for expelling the adsorbed oxides, in many cases the hot gases or hot air may be allowed to come into direct contact with the carbon, and on emerging from the tower, to mingle with the expelled oxides. The blower 13 drives the original gas mixture into the towers, and the blower 14 exhausts the oxides, after adsorption, along with any hot air or hot gas used for driving out the adsorbed oxides.

The following description of the mode of operation of such an apparatus, applies especially to the use of it for adsorbing oxides of nitrogen and residual sulphur dioxide from the gas mixture escaping from the final Gay-Lussac tower of a plant manufacturing sulfuric acid by a nitration process. But obviously this serves only as an illustration of the application of this invention, which is not limited to this particular mode of procedure.

Referring again to the drawing, the gas mixture escaping from the final Gay-Lussac tower of a sulphuric acid plant, is conveyed by suitable conduit to blower 13, by which it is forced through pipe 1 and open valve 3 into carbon tower 2, (valve 3' being closed). The activated carbon in tower 2, which may be packed loosely in bulk in the tower, or deposited loosely on trays or shelves constructed for the purpose within the tower, and equipped or not equipped, as may be desired, with agitators or stirrers for exposing, by movement, fresh surfaces of the carbon particles to contact with the gas mixture, adsorbs the sulphur dioxide, then the oxides of nitrogen, present in the gas mixture, and the unadsorbed gases escape through exit pipe 5. These gases ordinarily can be allowed to escape from pipe 5 into the atmosphere. When the carbon within tower 2 approaches the saturation point, with respect to adsorption of nitrogen oxides and sulphur dioxide, valves 3 and 4 are closed, and simultaneously valves 3' and 4' are opened, thus putting tower 2' into service as an adsorber. Hot air or other hot gases or steam is conducted into tower 2, through pipe 6 and valve 7, for the purpose of expelling the adsorbed oxides from the carbon. We prefer to use, for this purpose, hot gas containing 3 per cent (or more or less) by volume of sulphur dioxide, when the liberated oxides are to be used for the manufacture of sulphuric acid. Such gas, at a temperature of 200° F. or more (and usually at a much higher temperature) is ordinarily available from the sulphur burners, or roasting or smelting furnaces supplying sulphurous gas to the acid plant; and at temperatures above 200° F., not only is the sulphur dioxide not adsorbed by the carbon, but it expels any sulphur dioxide as well as any oxides of nitrogen, previously adsorbed from a relatively cool gas mixture. When using hot furnace or burner gas or hot air for expelling adsorbed gases from the carbon, the discharged gas mixture leaves tower 2 through valve 8, pipe 9 and exhauster 14, and is conveyed by suitable conduit, preferably to the front end of the acid plant (e. g. into the first chamber after the Glover tower) for use in the manufacture of sulphuric acid.

It is not necessary to expel all of the adsorbed gases from the carbon, but only such quantity as will render the carbon of service during its interval of use as adsorber, while tower 2' is out of use, as such. After a sufficient quantity of the adsorbed oxides have been expelled from tower 2, the supply of hot gas or hot air is shut off, and then cold air may be introduced, if necessary through pipe 10, and valves 11 and 7, to cool the carbon, and drive out residues of hot gas or air. Such cold air may escape through valve 4 and pipe 5 to the atmosphere. When tower 2 is again ready for use as adsorber, the process is reversed, tower 2 again receives the gas mixture from the Gay-Lussac tower, and tower 2' is treated for the removal of adsorbed oxides.

If necessary, three or more towers may be used as adsorbers in rotation. In such case, while one tower is in service as the adsorber, the towers not so in service would be at various stages of the cycle—a second tower receiving hot gas for expulsion of adsorbed oxides, a third receiving cold air for cooling, and a fourth standing ready for immediate service as adsorber, when the carbon in the first tower approaches the saturation point.

If desired, the carbon towers may be cooled with water externally, or may be fitted internally with coils of pipe for circulation of cold water to facilitate cooling, during adsorption, or to cool rapidly a tower after treatment with hot gas or hot air. Such coils may also be used for heating the carbon with steam, if desired, during the gas-expulsion process, and then the same coils may be used for circulation of cold water for cooling the carbon.

Two or more carbon towers or chambers may be used as adsorbers for oxides of nitrogen in series or in parallel, if one tower is deemed inadequate to adsorb the desired quantity of nitrogenous gas. The carbon towers may be down-drafted, if desired, and in many cases, down-drafting may be preferable, either for adsorption or for elimination of nitrogen oxides.

In the application of this invention for the recovery of oxides of nitrogen from the gas mixture discharged from a sulfuric acid plant, we prefer to pass the gas mixture, at not more than 170° F., escaping from the last lead chamber (or its technical equivalent), or from a Gay-Lussac tower, into direct contact with the activated carbon, until the latter has adsorbed at least five per cent of its weight of oxides of nitrogen and sulfur dioxide.

For the expulsion of the adsorbed oxides from the carbon, we prefer to use a gas mixture containing three per cent or more of sulphur dioxide by volume, at a temperature between 200° F. and 800° F. (although gases containing a much smaller percentage of $SO_2$ can also be used if desired). Temperatures of higher than about 250°-400° F., are less desirable at this stage, and in any event, temperatures which can ignite the carbon must be avoided. We prefer to pass the hot sulfurous gas in contact with the carbon, until the latter has attained a temperature of between 200° and 350° F., and we prefer to use such a volume of sulfurous gas at such a temperature, as will remove at least one-fourth of the adsorbed oxides within the space of 24 hours.

After the treatment with hot sulfurous gas, the carbon may still retain as much as 75 per cent of the nitrogen oxides first adsorbed, and still be useful for further adsorptive purposes. Any such proportion of adsorbed oxides of nitrogen will not be lost, but will remain dormant in or upon the carbon until the next ensuing treatment with hot sulfurous gas, or some subsequent treatment, and some residual oxides of nitrogen may never be driven out, but may remain as a more or less constant percentage, continually with the carbon.

Following the treatment with hot sulfurous gas, we prefer to sweep out any residual sulfurous gas by passing a blast of air at atmospheric temperature into contact with the carbon while the latter is still hot, for at least ten minutes. In some cases we prefer to sweep out the residual sulfurous gas with a blast of hot air at a temperature of 200° F., or more, followed by a blast of air at atmospheric temperature, the latter continued until the carbon has attained a temperature suitable for further use as adsorbent.

We claim:

1. The process of separating oxides of nitrogen and sulfur dioxide from other gases in a gas mixture, some at least of such other gases being not readily retained by activated carbon, by adsorption of the oxides of nitrogen and sulfur dioxide in activated carbon, substantially as herein described.

2. The process of expelling from activated carbon, adsorbed gases containing oxides of nitrogen, which comprises passing hot gases containing sulphur dioxide in contact therewith.

3. The process of expelling adsorbed gases from activated carbon by passing hot gases containing sulphur dioxide into contact therewith, substantially as herein described.

4. In the manufacture of sulphuric acid by a nitration process, the improvement which comprises passing the gases escaping from the final Gay-Lussac tower into direct contact with activated carbon for the adsorption of oxides of nitrogen, expelling the adsorbed gases by treating such carbon with relatively hot sulphurous gases, and conveying the said sulphurous gases, together with the said adsorbed and expelled oxides, into the acid-making apparatus, substantially as described.

5. In the manufacture of sulphuric acid by a nitration process, the process of passing the gas mixture used in such manufacture, after removal therefrom of a substantial proportion of the sulphur dioxide originally contained therein, into direct contact with activated carbon, for the adsorption of oxides of nitrogen and sulphur dioxide expelling the adsorbed oxides from said carbon by treatment thereof with hot sulphurous gases, and of conveying the said sulphurous gases together with the said adsorbed and expelled oxides, into the acid-making apparatus, substantially as herein described.

6. In the manufacture of sulphuric acid by a nitration process, the process of recovering the oxides of nitrogen from the spent gas mixture, from which the original proportions of sulphur dioxide have been to a large extent previously removed, by means of activated carbon, in lieu of the usual Gay-Lussac tower, substantially as herein described.

7. An improvement in the chamber process of making sulphuric acid which comprises passing the relatively cool gases from the latter part of the chamber plant into contact with a mass of activated carbon, until said carbon has adsorbed a considerable quantity of nitrogen oxides, then discontinuing such passage of such gas, and passing in contact with said carbon a hot gas containing a constituent usable in the said acid making process, and continuing such treatment until a considerable part of the adsorbed nitrogen oxide has been driven from said carbon, and leading the gases produced in the last mentioned step, into the chamber plant.

8. In the chamber system of making sulphuric acid, the improvement of withdrawing gases from the latter part of the system, passing the same into contact with a mass of activated carbon until said carbon has taken up a large part at least of the total amount of nitrogen oxides that it is capable of taking up, while allowing the unadsorbed gases to pass out of the system, then discontinuing such passage of said gases passing hot gases containing $SO_2$ into contact with said mass of carbon, and thence into the front part of the chamber system.

EDWARD M. JONES.
GEORGE E. BEAVERS.
ANDREW M. FAIRLIE.
JOHN N. HOUSER.